United States Patent
Fullbright et al.

(10) Patent No.: US 10,484,471 B2
(45) Date of Patent: Nov. 19, 2019

(54) BRIDGING CLOUDS

(71) Applicant: NetApp, Inc., Sunnyvale, CA (US)

(72) Inventors: John Keith Fullbright, Evans, GA (US); Mark Beaupre, Los Gatos, CA (US); Lee Gates, Seatte, WA (US)

(73) Assignee: NETAPP, INC., Sunnyvale, CA (US)

( * ) Notice: Subject to any disclaimer, the term of this patent is extended or adjusted under 35 U.S.C. 154(b) by 517 days.

(21) Appl. No.: 14/709,306

(22) Filed: May 11, 2015

(65) Prior Publication Data

US 2015/0326467 A1    Nov. 12, 2015

Related U.S. Application Data

(60) Provisional application No. 61/992,106, filed on May 12, 2014.

(51) Int. Cl.
*G06F 15/173* (2006.01)
*H04L 29/08* (2006.01)
(Continued)

(52) U.S. Cl.
CPC ...... *H04L 67/1097* (2013.01); *H04L 12/4641* (2013.01); *H04L 45/02* (2013.01);
(Continued)

(58) Field of Classification Search
CPC ..... H04L 12/4641; H04L 45/02; H04L 45/04; H04L 45/14; H04L 67/1097; H04L 67/16; H04L 45/64
(Continued)

(56) References Cited

U.S. PATENT DOCUMENTS 7,869,436 B1 *  1/2011  Adler ............. H04L 12/4641
                                               370/351
9,019,962 B1 *  4/2015  Ghosh .............. H04L 49/3009
                                               370/392
(Continued)

FOREIGN PATENT DOCUMENTS

WO    WO-2013174096 A1    11/2013
WO    WO-2013177246 A1    11/2013

OTHER PUBLICATIONS

Cisco 'Cisco Active Network Abstraction 3.7 Reference Guide.' Text Part Numb 1-21 er: OL-20014-02, Feb. 1, 2010 Retrieved from the Internet: . See pp. 11-1-11-5.
(Continued)

*Primary Examiner* — Liang Che A Wang
*Assistant Examiner* — Johnny B Aguiar
(74) *Attorney, Agent, or Firm* — Haynes and Boone, LLP

(57) ABSTRACT

Technology is disclosed for bridging clouds of computing devices for compute and data storage. The technology can receive a virtual routing table (VRT), wherein the VRT indicates an association with a virtual local area network (VLAN) and defines neighbors for each route wherein at least one neighbor is defined for each of the two different cloud service providers, wherein the route definition creates a private transitive network between the neighbors; receive from a first node a first message destined for a second node; determine that the first message employs the route specified by the VRT; forward the first message to the second node; receive from a third node a second message destined for the second node; determine that the second message does not employ the route specified by the VRT; and fail to forward the second message to the second node.

15 Claims, 5 Drawing Sheets

(51) Int. Cl.
  *H04L 12/721* (2013.01)
  *H04L 12/46* (2006.01)
  *H04L 12/751* (2013.01)
  *H04L 12/715* (2013.01)
(52) U.S. Cl.
  CPC .............. *H04L 45/04* (2013.01); *H04L 45/14* (2013.01); *H04L 45/64* (2013.01); *H04L 67/16* (2013.01)
(58) Field of Classification Search
  USPC .................................. 709/238, 242; 370/401
  See application file for complete search history.

(56) References Cited

U.S. PATENT DOCUMENTS

| | | | | |
|---|---|---|---|---|
| 9,306,949 | B1* | 4/2016 | Richard | H04L 63/10 |
| 2002/0103921 | A1* | 8/2002 | Nair | H04L 45/00 709/232 |
| 2003/0018693 | A1* | 1/2003 | Rosenfeld | H04L 47/10 709/200 |
| 2008/0219268 | A1* | 9/2008 | Dennison | H04L 12/4625 370/395.2 |
| 2012/0110055 | A1* | 5/2012 | Van Biljon | G06Q 30/04 709/201 |
| 2012/0151057 | A1* | 6/2012 | Paredes | H04L 12/4641 709/225 |
| 2012/0258777 | A1 | 10/2012 | Huang | |
| 2013/0227670 | A1* | 8/2013 | Ahmad | H04L 41/5054 726/11 |
| 2014/0006580 | A1 | 1/2014 | Raghu et al. | |
| 2014/0022951 | A1 | 1/2014 | Lemieux et al. | |
| 2014/0181186 | A1* | 6/2014 | Stevens | H04L 67/322 709/203 |
| 2014/0334495 | A1* | 11/2014 | Stubberfield | H04L 49/354 370/401 |
| 2015/0092772 | A1* | 4/2015 | Copeland | H04L 45/745 370/389 |

OTHER PUBLICATIONS

International Search Report and Written Opinion for Application No. PCT/US2015/030211 dated Aug. 19, 2015, 9 pages.
Rosen, E. and Y. Rekhter, "BGP/MPLS IP Virtual Private Networks (VPNs)," RFC 4364, Feb. 2006, 42 pages.
Extended European Search Report for Application No. EP15793137 dated Mar. 19, 2018, 8 pages.
European Office Action for Application No. EP15793137, dated Sep. 10, 2019, 3 pages.

* cited by examiner

BRIDGING CLOUDS

CROSS REFERENCE TO RELATED APPLICATION

This application claims the benefit of U.S. Provisional Application No. 61/992,106, filed May 12, 2014, and entitled "BRIDGING CLOUDS," which is incorporated herein in its entirety by reference.

BACKGROUND

A network data storage controller ("storage controller") is a physical computing device that is used to store and retrieve data on behalf of one or more other computing devices ("hosts") that are interconnected with the storage controller via a data communications network, e.g., an intranet or the Internet. A storage controller can be configured (e.g., by hardwiring, software, firmware, or any combination thereof) to operate as a storage server that serves one or more clients on a network, to store and manage data in a set of mass storage devices, e.g., magnetic or optical storage-based disks, solid state storage devices, tapes, etc. Some storage servers are designed to service file-level requests from hosts, as is commonly the case with file servers used in a network attached storage (NAS) environment. Other storage servers are designed to service block-level requests from hosts, as with storage servers used in a storage area network (SAN) environment. Still other storage servers are capable of servicing both file-level requests and block-level requests, as is the case with certain storage servers made by NetApp®, Inc. of Sunnyvale, Calif., employing the Data ONTAP® storage operating system. Two or more such storage servers ("nodes") are typically connected to form a storage "cluster." Storage server nodes and clusters are generally configured for use in data centers operated by or for enterprises, e.g., to store application data, configuration data, virtual machine files, etc. (collectively, "data").

Although addition of storage server nodes and/or clusters enable storage of massive amounts of data, enterprises are also increasingly relying on "cloud data storage service providers" to store data outside their data centers, e.g., for disaster recovery, reduced operating costs, reduced capital expenditures, reduced latencies in regions remote from their data centers, etc. Examples of cloud data storage service providers are Amazon® Simple Storage Service ("S3"), Microsoft® Azure®, Rackspace®, etc.

The various cloud data storage providers can charge different rates for different data storage services, e.g., depending on location, capacity, availability, throughput, volume, and other such service level objectives ("SLOs"). The cloud data storage providers commonly even charge different rates for similar data storage services. Enterprises and other consumers of cloud data storage providers thus sometimes desire to minimize their data storage expenses by moving data from their data centers to cloud data service providers and/or between cloud data storage providers. However, when they move their data, they must reconfigure their applications or systems that use this data and/or their network communications devices because the location (e.g., Internet Protocol ("IP") address) of the data is now different. Sometimes, even after applications and/or network communications devices are reconfigured, the applications may nevertheless still be unable to locate the data, e.g., because of network address collisions or other network communications errors. Sometimes, enterprises may need to make the data available from different cloud service providers concurrently, e.g., to reduce latencies by causing data to be stored proximate to the hosts that will access the data.

In the classless inter-domain routing ("CIDR") standard that is generally in use today in Internet Protocol ("IP") data communications, IP addresses are described as consisting of two groups of bits: the most significant bits are a network address that identifies a network or subnet "routing prefix," and the least significant bits form host identifiers that specify a particular interface of a host on that network. CIDR notation is a syntax for specifying IP addresses and their associated routing prefix. It appends a slash character to the routing prefix address and the decimal number of leading bits of the routing prefix address, e.g., 192.168.2.0/24 for IPv4, and 2001:db8::/32 for IPv6. This scheme enables multiple hosts to have the same IP address as long as the hosts are on different subnets. For example, two home users can commonly have conflicting IP addresses, 192.168.1.1, yet still send and receive IP packets because they are in different subnets. Similarly, some enterprises may have conflicting ranges of IP addresses that they use internally. These conflicting ranges of IP addresses can make it difficult for enterprises to move their data to cloud service providers without fear of network collisions that could cause data corruption and other issues. For example, when two enterprises (or other users) both become "tenants" in a cloud service provider's infrastructure (e.g., store data), they may both attempt to access data located at the conflicting IP addresses. Cloud service providers generally prevent such conflicting use, thereby causing some applications to fail.

DETAILED DESCRIPTION

Figure 1:
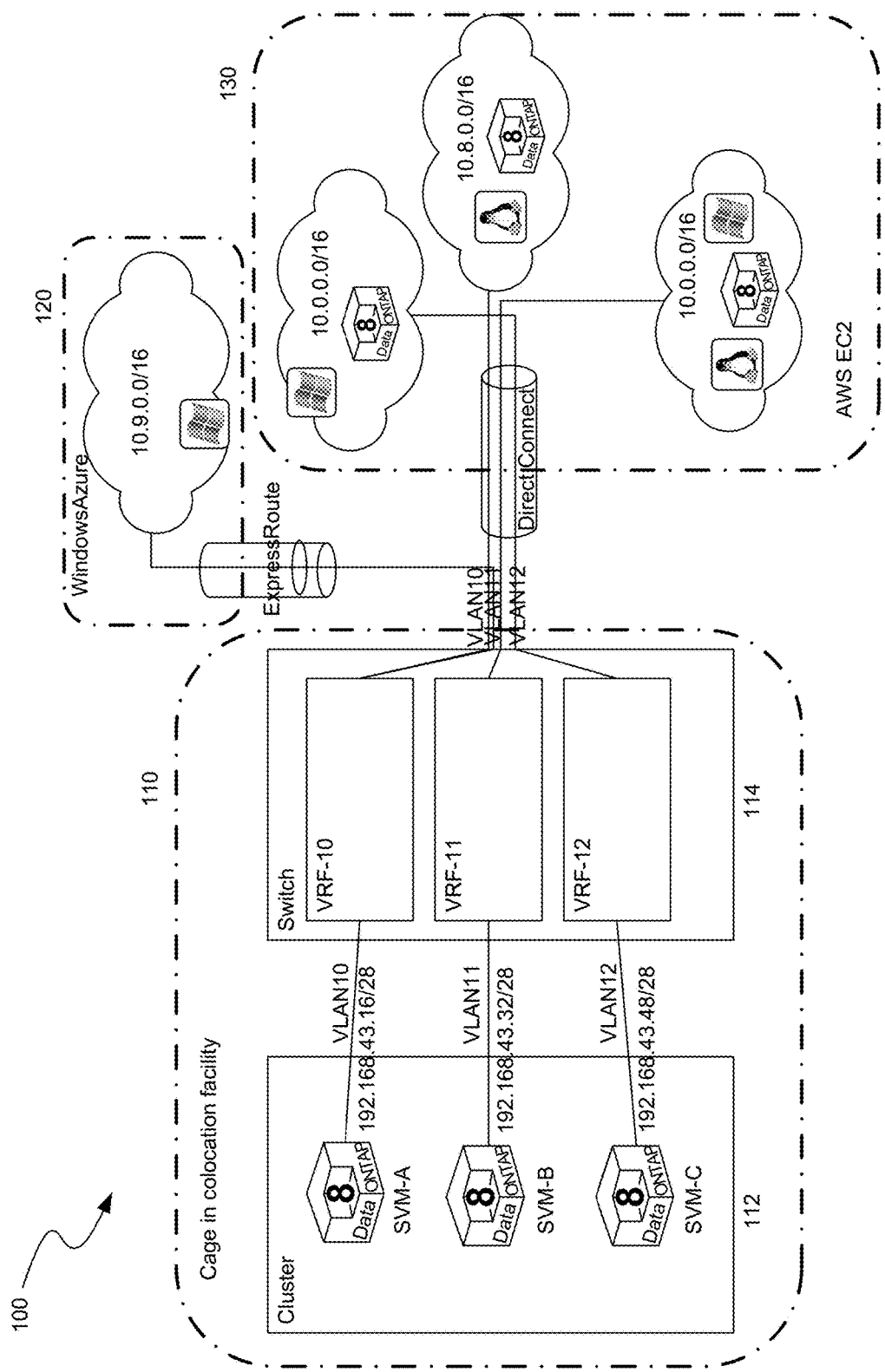
FIG. 1 is a block diagram illustrating an environment in which the disclosed technology may operate in various embodiments.

Technology is described for transitively communicating data between cloud service providers. In various embodiments, the technology enables applications to access data on at least two separate cloud service provider infrastructures, e.g., even when network locations associated with the accessed data of a tenant conflict with network locations associated with a different tenant. The technology can force communications messages (e.g., IP packets) exchanged between two nodes, each in a different cloud service provider's infrastructure to transit a third node, e.g., a node at a data center or a colocation facility. For example, an enterprise that uses two separate cloud service provider nodes C1 and C2, respectively, may also deploy a network node N1. Node N1 may be a data storage server, a router, or some other data storage device. Nodes C1 and/or C2 can be a virtual data storage node, a virtual compute node, or other type of node provided by cloud service providers.

In various embodiments, the technology employs virtual routing tables (VRTs) to implement a secure multitenant network access model that enables network resources to be isolated for each tenant in a distributed manner. VRTs can be implemented as partitions of Virtual Routing and Forwarding (VRF) tables or as separate forwarding tables. VRF is an Internet technology that enables multiple instances of a routing table to simultaneously coexist at a networking device. Because the routing table instances are independent, overlapping ranges of IP addresses can be routed differently. In some embodiments, the multiple instances can be identified as partitions in a common table. Each VRT can be associated with a tenant. Although a particular tenant may have multiple associated partition tables, in various embodiments, no partition table may be associated with multiple tenants. Each partition table is then associated with a virtual local area network (VLAN) corresponding to the tenant. A VLAN is a layer-2 network that is partitioned via software (rather than through physical links) so that communications (e.g., data communications packets) are isolated to within a particular VLAN. The terms VRT and VRF can sometimes be used interchangeably, but one skilled in the art will be able to discern whether a portion or a whole of the VRF is meant.

Thus, the technology permits "tenants" of data centers (e.g., different owners or operators of servers) to be isolated by VLAN, Subnet, and Route Table, even though multiple CIDRs may collide. Moreover, multiple compute providers can plug into the architecture, and the identifying characteristic for a tenant is its VLAN.

In various embodiments, the VRT can be stored (e.g., configured for use) at the network node N1 or at other nodes in the VLAN. Network "neighbors" are then identified in the VRTs. For example, nodes C1 and C2 can be identified as network neighbors in the VRT at node N1. When a neighbor is identified for a node (e.g., N1) in a VRT, a higher level protocol than IP, e.g., border gateway protocol (BGP), multiprotocol label switching (MPLS), etc. can determine how to route messages (e.g., packets) of lower level protocols. For example, because if nodes C1 and C2 are identified in a VRT for node N1 as neighbors of N1, then when N1 receives a message from node C1 destined for node C2, node C1 can route the received message appropriately. Nodes C1 and C2 enable this possibility by assigning "labels" to messages. A label can be identified in an additional header field that is added to a message that is sent. For example, when node C1 sends a message destined for node C2, node C1 can append a header to an IP message that node N1 can review to determine that node C2 is to receive the message. Upon receiving the message, node C2 can extract the IP message (e.g., by removing the additional header) and process the received message as it normally would. Because nodes C1, N1, and C2 can safely ignore IP address information (e.g., because they can rely on the labels of the higher level protocol), N1 is capable of handling networking traffic for multiple tenants with conflicting IP addresses. Moreover, because the messages transit N1, the technology is capable of implementing tenant isolation for multiple cloud providers in a manner that assures that network traffic between tenants is not mixed and each cloud service provider can house tenants with conflicting IP addresses.

Thus, node N1 becomes a virtual router that can employ a common pathway to send and receive messages for multiple, isolated tenants. Similarly, node N1 can be configured to provide multipoint virtual networks, e.g., by defining VRT partitions (or multiple VRT tables), e.g., so that colliding CIDRs are not problematic.

An example VRT follows:
Router BGP 65000
  vrf VRF-26
    address-family ipv4 unicast
    network 192.168.43.16/28
    neighbor 169.254.253.10 remote-as 7777
    password 0 cfdbd111f8c5e29544689091328085682c1323f4e918a239
    address-family ipv4 unicast
    neighbor 192.168.100.130 remote-as 12345
    address-family ipv4 unicast
    neighbor 192.168.100.134 remote-as 12345
    address-family ipv4 unicast Each VRT section is associated with a label (VRF-26 here) and a definition of one or more neighbors, e.g., specified here with IP addresses 169.254.253.10, 192.168.100.130, and 192.168.100.134. This example uses VRFs. The neighbors can specify a valid route in a virtual private network. The VRT section can be associated with a single VLAN.

Several embodiments of the described technology are described in more detail in reference to the Figures. The computing devices on which the described technology may be implemented may include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can comprise computer-readable storage media (e.g., "non-transitory" media) and computer-readable transmission media.

Turning now to the figures, FIG. 1 is a block diagram illustrating an environment 100 in which the disclosed technology may operate in various embodiments. The environment 100 includes a portion 110 of a data center, e.g., a "cage" (e.g., one or more "racks" of computing devices) in a "colocation" facility. A colocation facility is a data center that may operate at a same facility as a cloud service provider, e.g., to provide fast network connections, but not within the data center infrastructure of the cloud service provider. The portion 110 of the data center can include a storage cluster 112 and a switch 114. The storage cluster 112 can house multiple storage virtual machines (SVMs), e.g., SVM-A, SVM-B, and SVM-C. A storage virtual machine is a virtual storage server. It can provide an interface to actual storage devices (or other computing devices that provide storage services), e.g., so that multiple tenants can employ the underlying computing device.

Each SVM may correspond to a VLAN. For example, SVM-A corresponds to VLAN10, SVM-B corresponds to VLAN11, and SVM-C corresponds to VLAN12. Each VLAN can have an associated VRT. For example, VLAN10 is associated with VRF-10, VLAN 11 is associated with VRF-11, and VLAN12 is associated with VRF-12.

The switch 114 can implement one or more VRTs, e.g., VRF-10, VRF-11, and VRF-12. In various embodiments, a storage device (e.g., storage cluster 112) can implement the VRTs. The VRTs can define routes between the SVMs and storage devices located within the infrastructures of cloud service operators. For example, VLAN10 and VLAN12 employ Amazon® Web Services (via Amazon's Direct Connect) whereas VLAN11 employs Microsoft® Azure® via Microsoft's Express Route). Two IP address ranges of storage devices inside the Amazon® infrastructure conflict (e.g., 10.0.0.0/16), but they can nevertheless coexist because they are in separate VLANs.

Upon implementation of the above environment, the technology permits exchanging data across cloud service providers and data centers.

Figure 2:
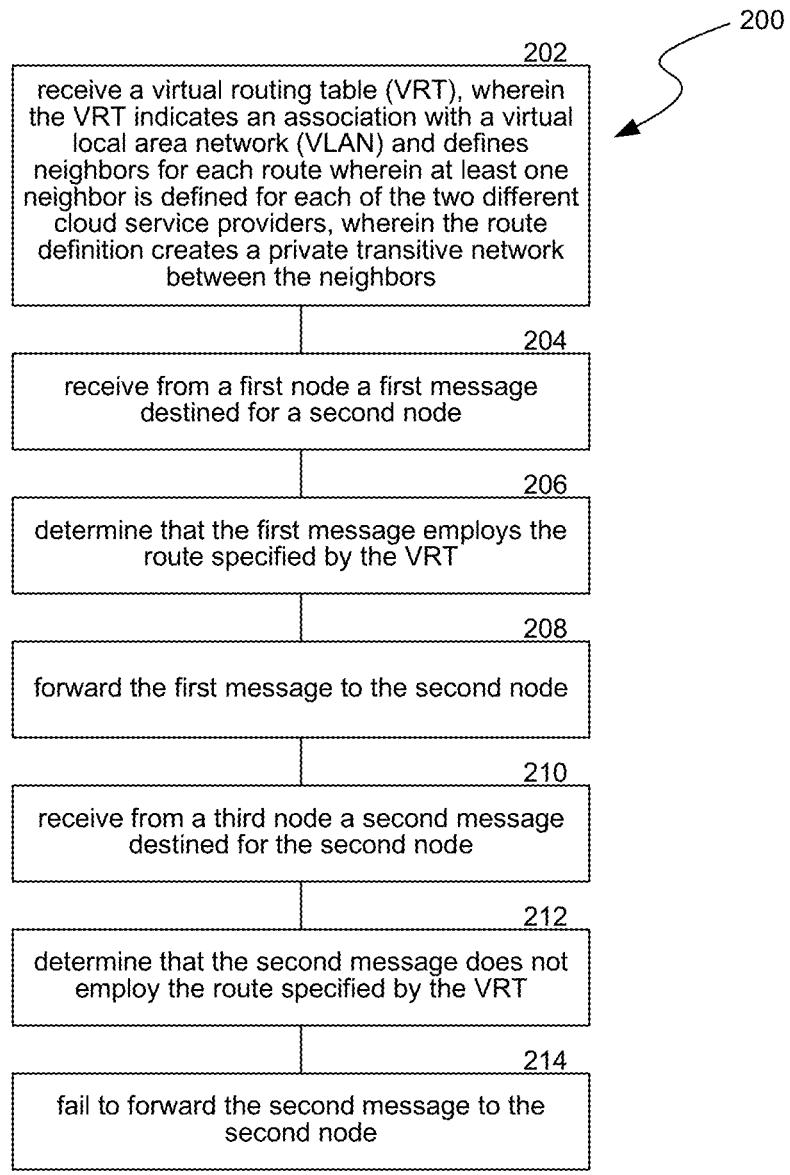
FIG. 2 is a flow diagram illustrating a routine invoked by the disclosed technology in various embodiments.

FIG. 2 is a flow diagram illustrating a routine 200 invoked by the disclosed technology in various embodiments. The routine can be invoked by a switch, a storage device, or other device configured to establish and maintain VLANs. At block 202, the routine receives a virtual routing table (VRT). The VRT can indicate an association with a virtual local area network (VLAN) and define neighbors for each route. At least one of the neighbors can be defined for each of the two different cloud service providers. The route definition can create a private transitive network between the neighbors.

At block 204, the routine receives from a first node a first message destined for a second node. For example, node N1 (e.g., a router, a switch, a storage device, etc.) may receive a message from node C1 destined for node C2.

At block 206, the routine determines that the first message employs the route specified by the VRT. This can indicate that there is a route defined between nodes C1 and C2 via N1.

At block 208, the routine forwards the first message to the second node.

At block 210, the routine receives from a third node a second message destined for the second node. For example, node N1 may receive a message from node C3 destined for C2.

At block 212, the routine determines that the second message does not employ the route specified by the VRT, e.g., because no path is defined by the VRT between nodes C3 and C2.

At block 214, the routine fails to forward the second message to the second node. The routine may instead return an error to the third node.

Those skilled in the art will appreciate that the logic illustrated in FIG. 1 and described above, and in each of the flow diagrams discussed below, may be altered in a variety of ways. For example, the order of the logic may be rearranged, substeps may be performed in parallel, illustrated logic may be omitted, other logic may be included, etc.

Figure 3:
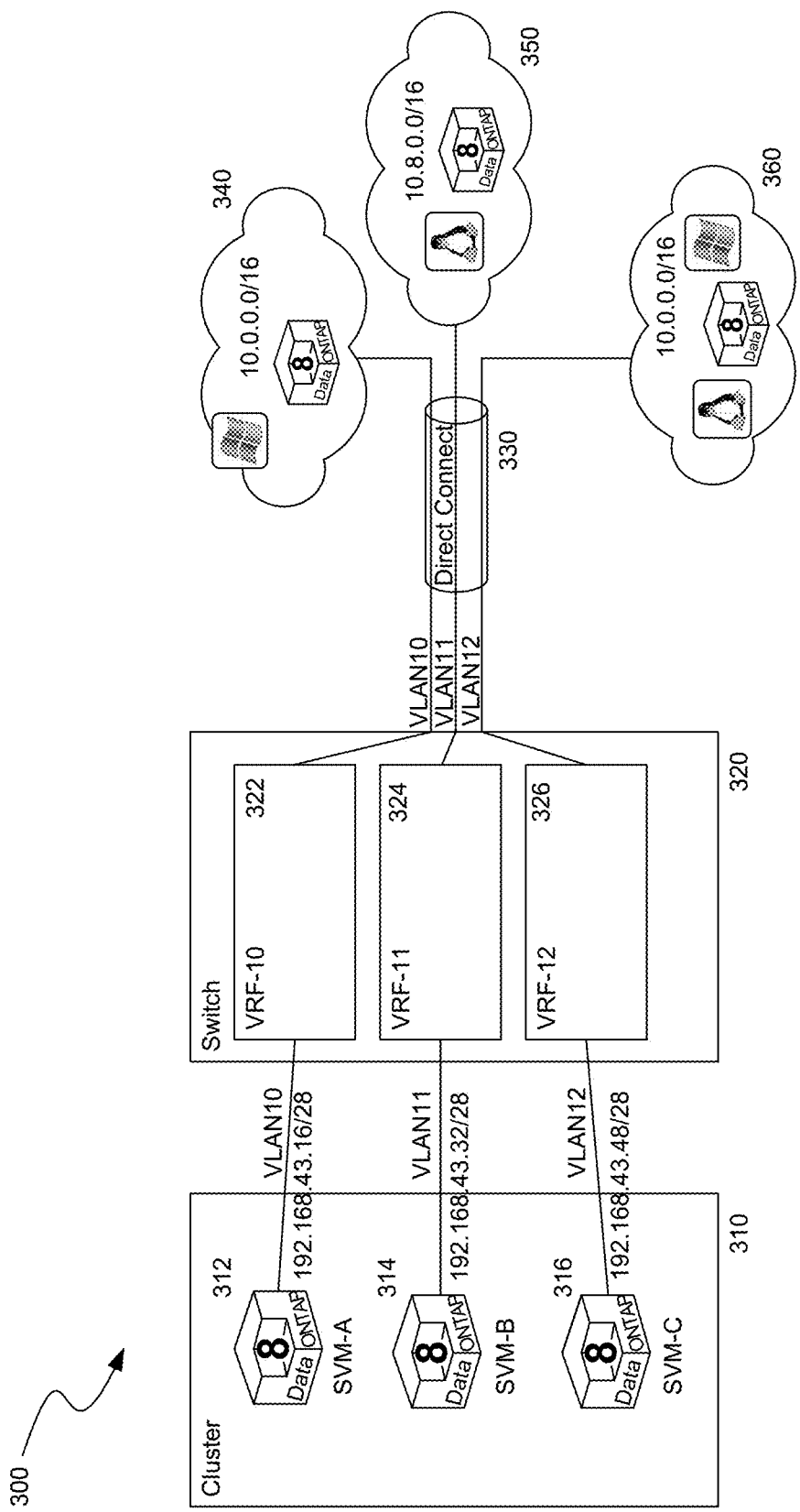
FIGS. 3-5 are block diagrams illustrating components of the disclosed technology, in various embodiments.
Figure 4:
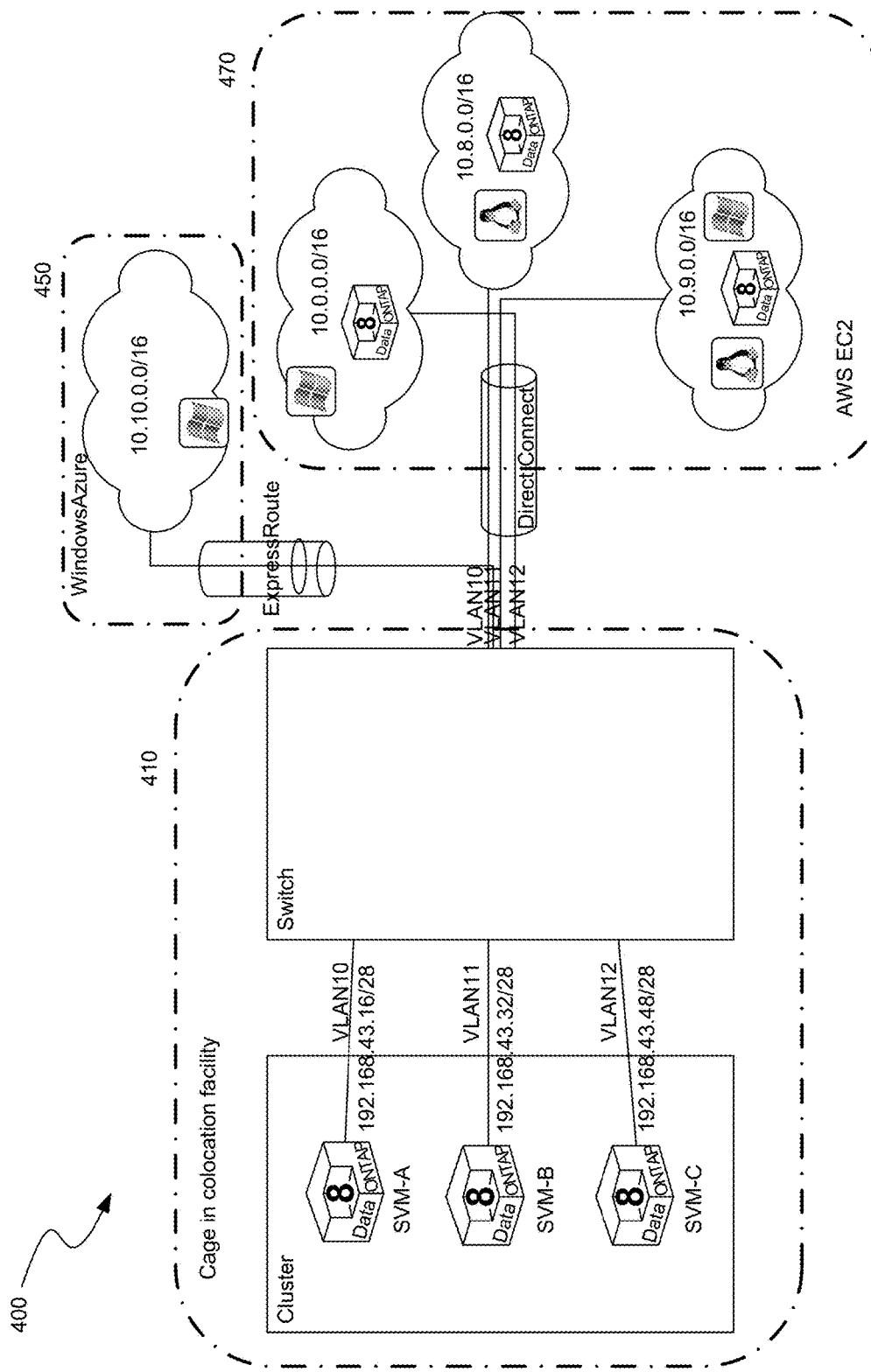
Figure 5:
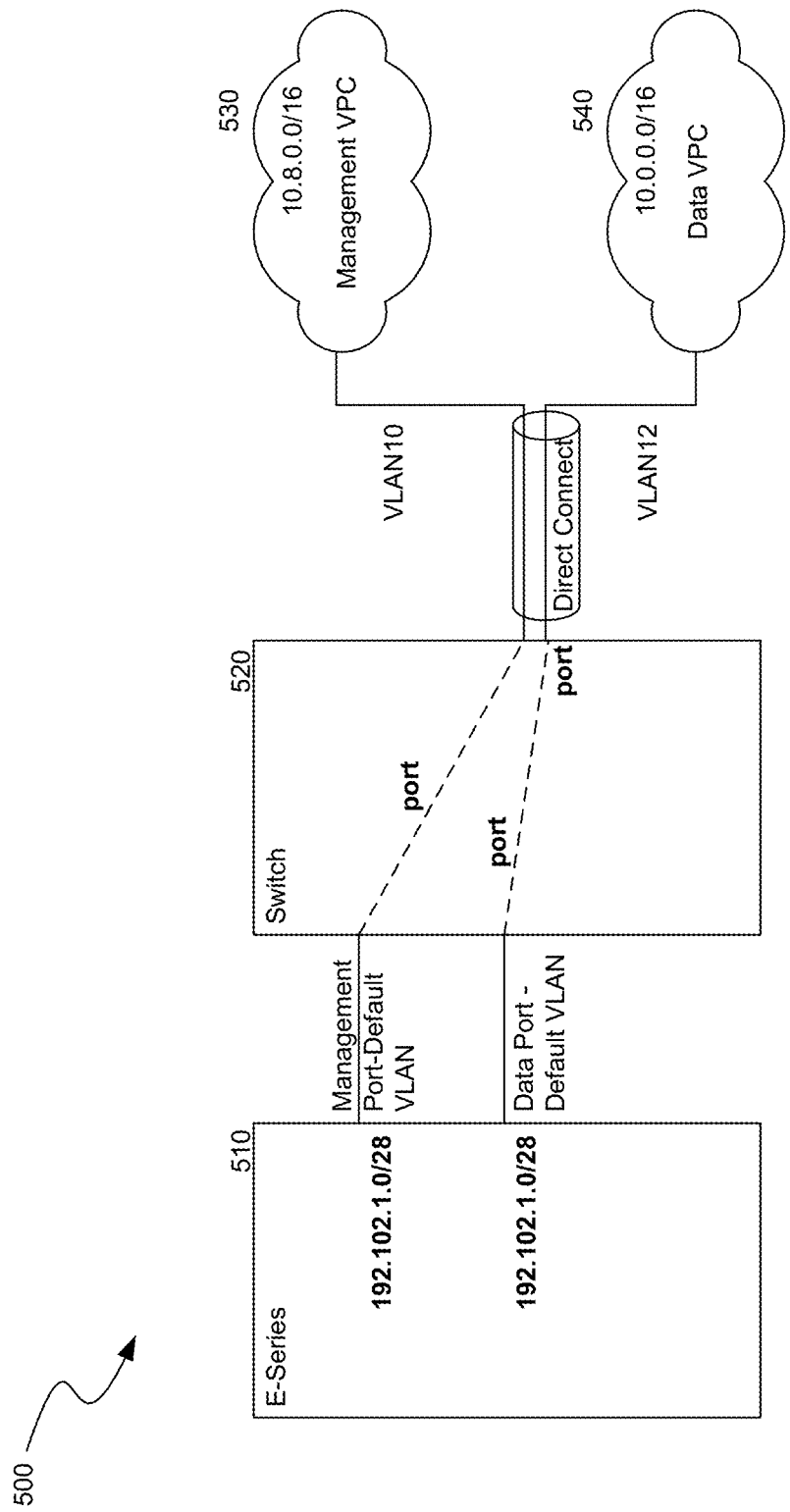

FIGS. 3-5 are block diagrams illustrating components of the disclosed technology, in various embodiments.

In FIG. 3, an ONTAP cDOT cluster 310 of storage controllers commercialized by the assignee of the instant application, NETAPP, stores a construct configured to provide storage called a "Storage Virtual Machine" (SVM). Each SVM is a node, e.g., SVM-A 312, SVM-B 314, and SVM-C 316. At least one of the nodes in the cluster or some other component (not illustrated) has physical network interfaces. Using those interfaces, the technology creates VLAN ports for VLANs 10, 11, and 12. From the VLAN ports, the technology creates logical interfaces ("LIFs"), each tagged with a separate VLAN, and assigns those LIFs to SVMs. Each physical interface that serves data on the cluster is attached to a trunk port on a switch 320. This is done so that traffic identified as being associated ("tagged") with multiple VLANs can travel over the port to the physical interface on the cluster, where the VLAN ports and LIFs reside. Traffic tagged VLAN10 is only received by the LIF created on VLAN10 ports. All of the ports for VLANs 10, 11, and 12, reside on the same physical interface and the LIFs are created from the VLAN ports. Only traffic tagged VLAN10 goes to SVM-A 312; only traffic tagged VLAN 11 goes to SVM-B 314; and only traffic tagged VLAN12 goes to SVM-C 316. Thus, the technology maintains VLAN separation from the switch all the way to the SVMs. Furthermore, the technology can create separate routing tables for each SVM through the use of IPspaces in the ONTAP operating system, and can maintain routing and broadcast domain separation in addition to VLAN separation all the way to the SVM.

The VLAN is a unique identifying characteristic of a tenant. For each tenant, technology creates a VLAN interface on the switch 320 and maintains VLAN separation at the switch. The technology also maintains routing table separation by creating a virtual routing and forwarding ("VRF") configuration for each tenant/VLAN. VRF is an IP technology that enables multiple instances of a routing table to coexist on the same router (or other network component) concurrently. No tenant can see the routes, reach by broadcast, or have inherent knowledge of any other tenant at the switch 320. By using VRF configurations 322, 324, and 326, each corresponding to VLANs 10, 11, and, 12, respectively, the technology avoids the need to use explicit "deny" (or other) permissions to prevent tenants from seeing other tenants' route information. This greatly simplifies switch configuration. In the BGP configuration, the technology advertises networks with the segregation being the VRF.

For each cloud compute provider (e.g., providers 340, 350, and 360), either a physical cross connect or a virtual circuit traversing a physical cross connect to a connected cloud exchange is plugged into a trunk port on the switch. This is so traffic from multiple tenants, each tagged with a unique VLAN ID can travel over the shared connection 330 to the cloud. A cloud, as that term is used here, can be a set of interconnected computing devices, e.g., at a data center. The connection can be a single connection or multiple bonded connections of a type supported by both the cloud compute provider and the switch 320 in a quantity sufficient to bear the aggregate traffic of all the tenants connecting to that cloud compute provider. Cloud compute providers, through their physical connectivity services (e.g., AMAZON'S AWS employs "DIRECT CONNECT", MICROSOFT's AZURE employs "EXPRESSROUTE", IBM employs "SOFTLAYER—DIRECTLINK", EQUINIX employs "EQUINIX CLOUD EXCHANGE", etc.) encapsulate a specific tenant's traffic origination on the default VLAN in that tenant's private address space within the compute provider's cloud over a specific VLAN ID unique to each tenant. The technology maintains VLAN separation all the way to the tenant's private IP address space.

The technology makes the VLAN ID the specific identifying characteristic of a given tenant in all locations: e.g., in the location of the storage, at the switch for the storage, and the virtual interface to the cloud compute provider's fleet. One skilled in the art will recognize that when the VLAN ID is the identifying characteristic of a tenant, significant advantages are realized. If a tenant is using more than one cloud compute provider or more than on colocation provider, then transitive routing to all the endpoints that share the identifying characteristic is simplified. A cloud computing provider provides physical or virtual computing devices. A colocation provider enables a customer to add computing devices to an existing set of computing devices (physical or virtual). For example, in FIG. 4, a set of networked computing devices in a co-location provider 410 and communicate using the technology with multiple cloud computing providers 450 and 470.

Within a single tenancy, multiple clouds can connect to the SVM for that tenancy. Compute instances in the clouds within a tenancy can transitively route to other clouds within the tenancy; maintaining VLAN, broadcast domain, routing, and route table separation between tenants. The switch configuration is greatly simplified reducing the likelihood of configuration errors, time required to configure, solution overall complexity, etc.

By creating VLAN ports on a physical Interface, LIFs from VLAN ports, and assigning a LIF to a construct that is capable of providing storage (e.g., an iSCSI target port, Storage Virtual Machine, etc.), the technology enables a flexible tenant communications architecture that is secure.

As illustrated in FIG. 5, the technology can also be adapted to other storage controllers than clusters. A storage controller 510 can be interconnected via a switch 520 to a management virtual computing device ("PC") 530 and a data virtual PC 540. The management and data PCs can be on different clouds.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

The invention claimed is:

1. A method comprising:
   creating, by a storage device, a first virtual local area network (VLAN) and a second VLAN;
   routing, by the storage device using a first virtual routing table (VRT) associated with the first VLAN and a first tenant in the first VLAN, a first Internet Protocol (IP) message between the first tenant and a first cloud service provider, wherein the first cloud service provider is identified as a neighbor in the first VRT, and the first IP message includes a first header indicating in a protocol level different than IP that the first cloud service provider is to receive the first IP message; and
   routing, by the storage device using a second VRT associated with the second VLAN and a second tenant in the second VLAN, a second Internet Protocol (IP) message between the second tenant and a second cloud service provider, the second IP message including a second header indicating in the protocol level different than IP that the second cloud service provider is to receive the second IP message, wherein the first cloud service provider and the second cloud service provider have an overlapping IP address range, and wherein the first IP message and the second IP message are directed to the overlapping IP address range at the first cloud service provider and the second cloud service provider.

2. The method of claim 1, wherein the first header comprises a header field with an identifier for the first VLAN.

3. The method of claim 1, further comprising creating a port of the first VLAN on a physical interface of a storage cluster of the first tenant, wherein the physical interface is connected to a trunk port of the first VRT.

4. The method of claim 1, wherein the first VRT is identified as a labeled portion of a virtual routing and forwarding (VRF) table.

5. The method of claim 1, wherein the second VRT is partitioned from the first VRT.

6. A computing device comprising:
   a memory containing machine-readable medium comprising machine executable code having stored thereon instructions for performing a method of exchanging data across different cloud service providers; and
   a processor coupled to the memory, the processor configured to execute the machine executable code to cause the processor to:
   create, by a storage device, a first virtual local area network (VLAN) and a second VLAN;
   route, by the storage device using a first virtual routing table (VRT) associated with the first VLAN and a first tenant in the first VLAN, a first Internet Protocol (IP) message between the first tenant and a first cloud service provider, wherein the first cloud service provider is identified as a neighbor in the first VRT, and the first IP message includes a first header indicating in a protocol level different than IP that the first cloud service provider is to receive the first IP message; and
   route, by the storage device using a second VRT associated with the second VLAN and a second tenant in the second VLAN, a second Internet Protocol (IP) message between the second tenant and a second cloud service provider, the second IP message including a second header indicating in the protocol level different than IP that the second cloud service provider is to receive the second IP message, wherein the first cloud service provider and the second cloud service provider have an overlapping IP address range, and wherein the first IP message and the second IP message are directed to the overlapping IP address range at the first cloud service provider and the second cloud service provider.

7. The computing device of claim 6, wherein the first header comprises a header field with an identifier for the first VLAN.

8. The computing device of claim 6, further comprising code to cause the processor to create a port of the first VLAN on a physical interface of a storage cluster of the first tenant, wherein the physical interface is connected to a trunk port of the first VRT.

9. The computing device of claim 6, wherein the first VRT is identified as a labeled portion of a virtual routing and forwarding (VRF) table.

10. The computing device of claim 6, wherein the second VRT is partitioned from the first VRT.

11. A non-transitory machine-readable medium having stored thereon instructions for performing a method comprising machine executable code which when executed by at least one machine, causes the at least one machine to:
    create, by a storage device, a first virtual local area network (VLAN) and a second VLAN;
    route, by the storage device using a first virtual routing table (VRT) associated with the first VLAN and a first tenant in the first VLAN, a first Internet Protocol (IP) message between the first tenant and a first cloud service provider, wherein the first cloud service provider is identified as a neighbor in the first VRT, and the first IP message includes a first header indicating in a protocol level different than IP that the first cloud service provider is to receive the first IP message; and
    route, by the storage device using a second VRT associated with the second VLAN and a second tenant in the second VLAN, a second Internet Protocol (IP) message between the second tenant and a second cloud service provider, the second IP message including a second header indicating in the protocol level different than IP that the second cloud service provider is to receive the second IP message, wherein the first cloud service provider and the second cloud service provider have an overlapping IP address range, and wherein the first IP message and the second IP message are directed to the overlapping IP address range at the first cloud service provider and the second cloud service provider.

12. The non-transitory machine-readable medium of claim 11, wherein the first header comprises a header field with an identifier for the first VLAN.

13. The non-transitory machine-readable medium of claim 11, further comprising code to cause the machine to create a port of the first VLAN on a physical interface of a storage cluster of the first tenant, wherein the physical interface is connected to a trunk port of the first VRT.

14. The non-transitory machine-readable medium of claim 11, wherein the first VRT is identified as a labeled portion of a virtual routing and forwarding (VRF) table.

15. The non-transitory machine-readable medium of claim 11, wherein the second VRT is partitioned from the first VRT.

* * * * *